(12) United States Patent
Sung et al.

(10) Patent No.: US 12,090,897 B2
(45) Date of Patent: Sep. 17, 2024

(54) VEHICLE SEAT

(71) Applicants: Hyundai Motor Company, Seoul (KR); Kia Corporation, Seoul (KR); Wooshin Safety Systems Co., Ltd., Hwaseong-Si (KR)

(72) Inventors: Il Chang Sung, Hwaseong-Si (KR); Yong Ik Kim, Gwangmyeong-Si (KR)

(73) Assignees: Hyundai Motor Company, Seoul (KR); Kia Corporation, Seoul (KR); Wooshin Safety Systems Co., Ltd., Hwaseong-Si (KR)

( * ) Notice: Subject to any disclaimer, the term of this patent is extended or adjusted under 35 U.S.C. 154(b) by 0 days.

(21) Appl. No.: 18/102,064

(22) Filed: Jan. 26, 2023

(65) Prior Publication Data
US 2024/0092233 A1 Mar. 21, 2024

(30) Foreign Application Priority Data

Sep. 21, 2022 (KR) .................. 10-2022-0119494

(51) Int. Cl.
*B60N 2/02* (2006.01)
*B60N 2/16* (2006.01)
(Continued)

(52) U.S. Cl.
CPC ............. *B60N 2/20* (2013.01); *B60N 2/2213* (2013.01); *B60N 2/0272* (2023.08)

(58) Field of Classification Search
CPC .......... B60N 2/02; B60N 2/0272; B60N 2/20; B60N 2/22; B60N 2/2213; B60N 2/2218;
(Continued)

(56) References Cited

U.S. PATENT DOCUMENTS 1,711,476 A * 4/1929 Cravath ................. B60N 2/028
297/307
6,015,164 A 1/2000 Yano
(Continued)

FOREIGN PATENT DOCUMENTS

JP 2000079867 A 3/2000
JP 2021123259 A 8/2021
(Continued)

OTHER PUBLICATIONS

Description Translation for WO 2015/006313 from Espacenet (Year: 2015).*

(Continued)

*Primary Examiner* — Jason D Shanske
*Assistant Examiner* — Daniel M. Keck
(74) *Attorney, Agent, or Firm* — Banner & Witcoff, Ltd.

(57) ABSTRACT

A vehicle seat may have an angle detection device configured to detect a reclining angle of a seatback, an angle detection reference member configured to serve as a reference for the angle detection device, and a rotation limiting guide unit configured to connect a seat fixing structure to the angle detection reference member and to limit rotation of the angle detection reference member by guiding upward-and-downward and forward-and-rearward movements of the angle detection reference member during tilting of a seat cushion around a hinge structure.

19 Claims, 10 Drawing Sheets

(51) Int. Cl.
  *B60N 2/20* (2006.01)
  *B60N 2/22* (2006.01)
(58) Field of Classification Search
  CPC ...... B60R 2022/3402; B60R 2022/401; B60R 2022/402; B60R 2022/403; B60R 2022/405
  See application file for complete search history.

(56) References Cited

U.S. PATENT DOCUMENTS

| | | | |
|---|---|---|---|
| 6,068,340 | A | 5/2000 | Yano et al. |
| 6,340,209 | B1 | 1/2002 | Yamamoto et al. |
| 6,356,200 | B1 * | 3/2002 | Hamada ................ B60N 2/002 |
| | | | 177/144 |
| 7,828,391 | B2 | 11/2010 | Hibata et al. |
| 9,174,737 | B2 * | 11/2015 | Beroth ............... B64D 11/0641 |
| 2015/0258955 | A1 * | 9/2015 | Jayasuriya .............. B60R 22/26 |
| | | | 297/353 |
| 2016/0016488 | A1 * | 1/2016 | Farooq ..................... B60N 2/22 |
| | | | 297/354.12 |

FOREIGN PATENT DOCUMENTS

| | | | | |
|---|---|---|---|---|
| JP | 6964746 | B2 | 11/2021 | |
| KR | 100890852 | B1 | 3/2009 | |
| KR | 10-2020-0021618 | A | 3/2020 | |
| KR | 102540545 | B1 * | 6/2023 | ........... B60N 2/2213 |
| WO | WO-2015006313 | A2 * | 1/2015 | ......... B60N 2/01575 |

OTHER PUBLICATIONS

Description Translation for KR 102540545 from Espacenet (Year: 2023).*

* cited by examiner

FIG. 1A

(RELATED ART)

(RELATED ART)

VEHICLE SEAT

CROSS-REFERENCE TO THE RELATED APPLICATION

This application claims priority from Korean Patent Application No. 10-2022-0119494, filed on Sep. 21, 2022, in the Korean Intellectual Property Office, the disclosure of which is incorporated herein by reference in its entirety.

TECHNICAL FIELD

The present disclosure relates to a vehicle seat configured to prevent an error in angle detection by constantly maintaining a reference point of seatback angle detection regardless of a change in posture of a seat cushion or an entire seat in a reclining seat.

BACKGROUND

A retractor device is built into a seatback, and a retractor acceleration sensor is provided in the retractor device to restrain a seat belt in the event of vehicle collision.

However, when the seatback has any reclining angle, the retractor acceleration sensor built into the retractor device is also inclined by the reclining angle, which may cause unnecessary operation of a seat belt restraint device.

Figure 1A:
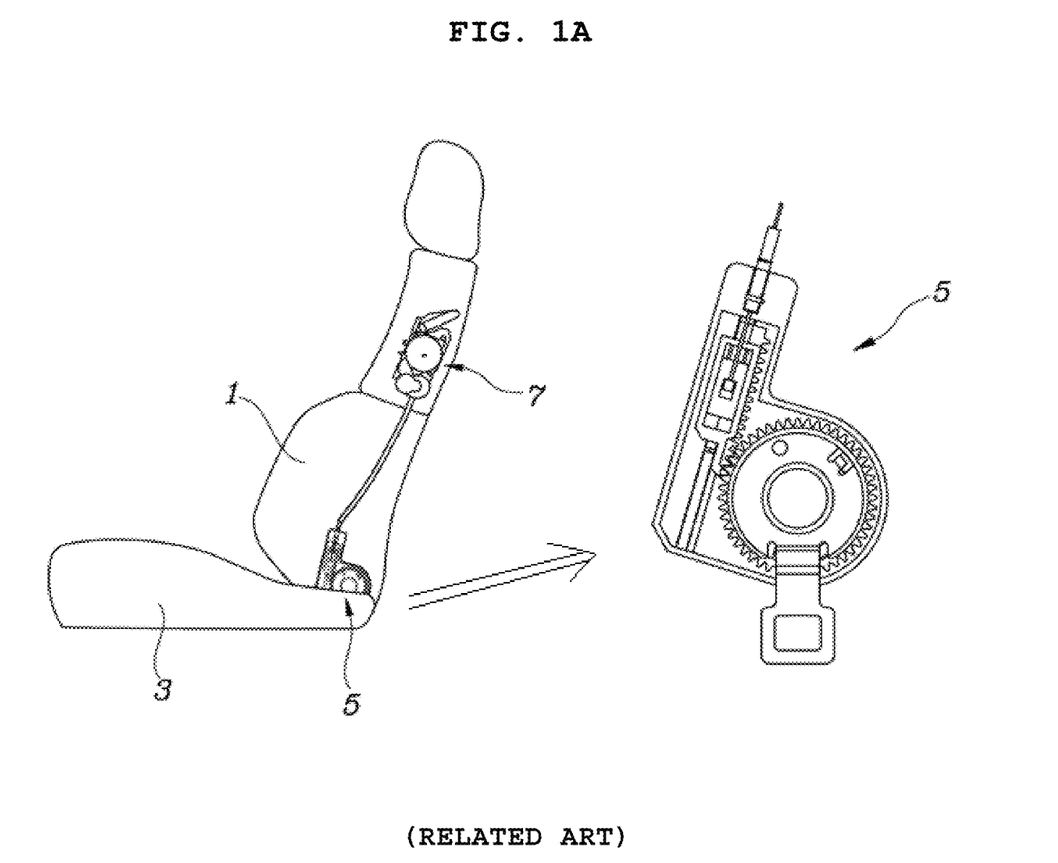
FIG. 1A and FIG. 1B are views showing operation of an angle detection device and a retractor device according to reclining of a seatback of the related art.
Figure 1B:
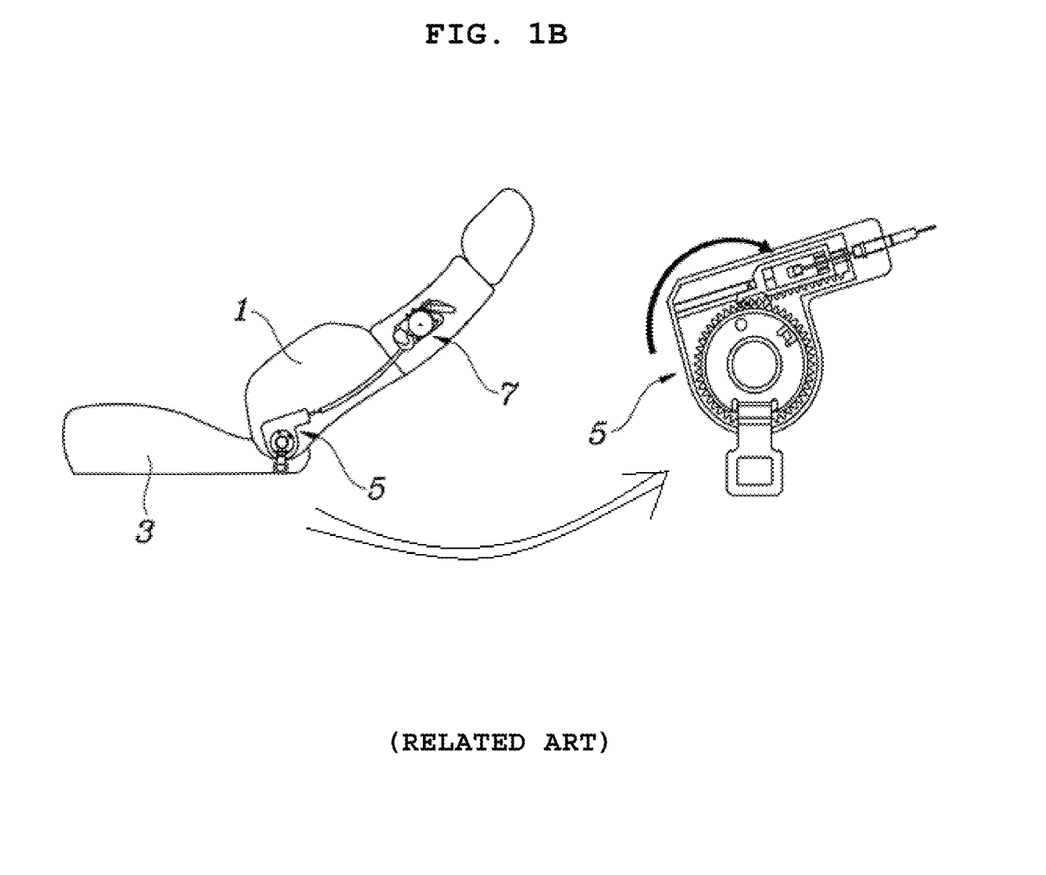

In order to solve this problem, as shown in FIG. 1A and FIG. 1B, when angle change of a seatback 1 occurs according to reclining of the seatback 1, a retractor acceleration sensor is rotated by the changed angle of the seatback 1 in a retractor device 7 to maintain horizontality of the retractor acceleration sensor, thereby preventing operation of the seat belt restraint device.

Figure 2:
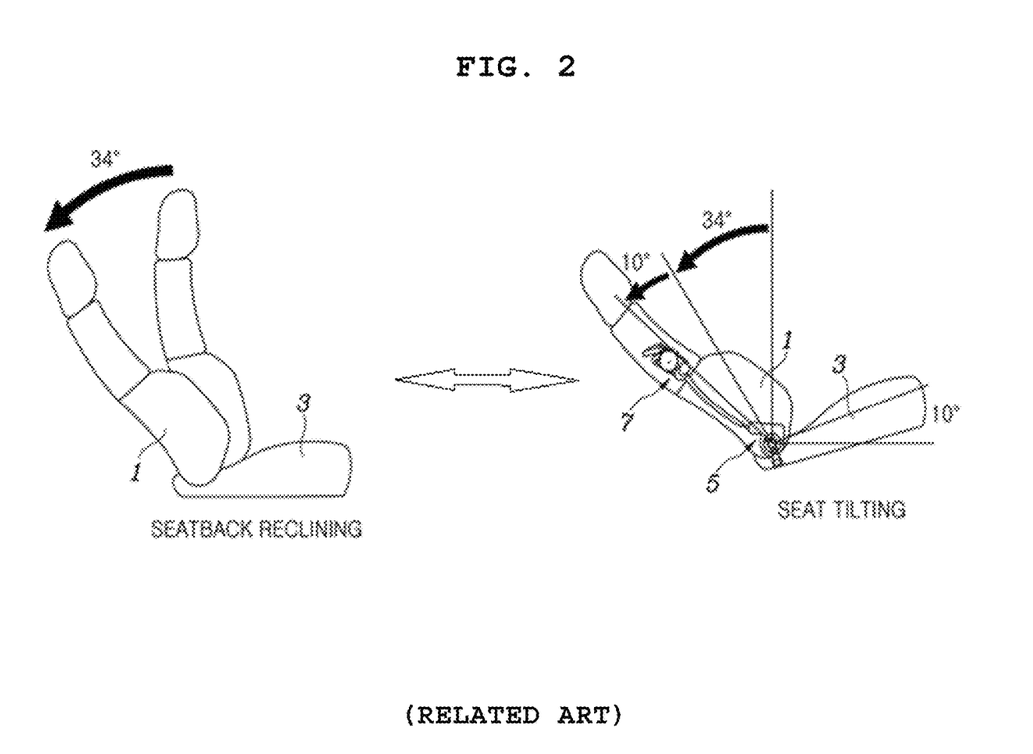
FIG. 2 is a view showing why an error may occur in detecting a seatback angle during tilting operation of a seat of the related art.

If an angle detection device 5 of the seatback 1 is fixed to a seat cushion 3 or the seatback 1, as shown in FIG. 2, when the posture of the seat cushion 3 or the entire seat is changed through tilting operation, an angle detection reference point of the angle detection device 5 moves, which causes an error in detecting a seatback angle.

The information disclosed in this Background section is only for enhancement of understanding the disclosure, and should not be taken as an acknowledgement or any form of suggestion that this information forms related art that would be already known to a person skilled in the art.

SUMMARY

Systems, apparatuses and methods are described herein for assembling and/or operating a vehicle seat and/or angle detection device for a vehicle seat. A vehicle seat is provided that comprises a seat cushion, a seatback connected to the seat cushion, an angle detection device configured to detect a reclining angle of the seatback, an angle detection reference member that is rotatable relative to a rotation shaft configured to allow the seatback to be reclined and a rotation limiting guide unit. The rotation limiting guide may be configured to connect a seat fixing structure to the angle detection reference member and configured to limit rotation of the angle detection reference member by guiding upward-and-downward movement or forward-and-rearward movement of the angle detection reference member when the seat cushion is tilted around a hinge structure.

The above and other features of the disclosure may be described in greater detail below.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Reference will now be made in detail to the examples of the present disclosure, examples of which are illustrated in the accompanying drawings. Wherever possible, the same reference numbers will be used throughout the drawings to refer to the same or like parts.

Hereinafter, terms "module", "unit", and "part" for components used in the following description are merely provided to distinguish between different elements, significant meanings or roles are not given to the terms themselves. As such, the terms "module", "unit", and "part" may be used interchangeably herein.

In the following description, if a detailed description of publicly known techniques to which the disclosure pertains may obscure the gist of the present disclosure, the detailed description will be omitted. Further, the accompanying drawings are provided to easily describe the examples disclosed in this specification. The technical idea disclosed in this specification is not limited by the accompanying drawings, and includes all modifications, equivalents, and substitutes that fall within the spirit and technical scope of the present disclosure.

Terms such as "first" and/or "second" may be used to describe various components, but the components are not limited by the terms. The terms are used only for the purpose of distinguishing one component from other components.

Directional terms, such as "upward", "downward", "forward", "rearward", "horizontal", and "vertical" as used herein refer to directions of the figures and/or directions relative to a vehicle in which the vehicle seat may be installed. Directional terms are used for reference and clarity of description of the structures of the present disclosure, and are not otherwise limiting (e.g., the present disclosure still applies to structures disclosed herein oriented in any particular direction relative to gravity and/or whether installed or not installed in a vehicle.

When one component is referred to as being "connected" or "joined" to another component, the one component may be directly connected or joined to the other component, or other components may be present therebetween. On the other hand, when the one component is referred to as being "directly connected to", "directly joined to" or "directly in contact with" the other component, no other components are present therebetween.

In this specification, an expression in a singular form also includes the plural sense, unless clearly specified otherwise.

Expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

As demonstrated in the FIGS. 3-9, an angle detection device 100 installed in a seat of the present disclosure may be configured to detect a reclining angle of a seatback 10. When the seatback 10 is reclined, the angle detection device 100 and a retractor device 200 are linked to constantly maintain horizontality of an acceleration sensor 230 in the retractor device 200.

Figure 3:
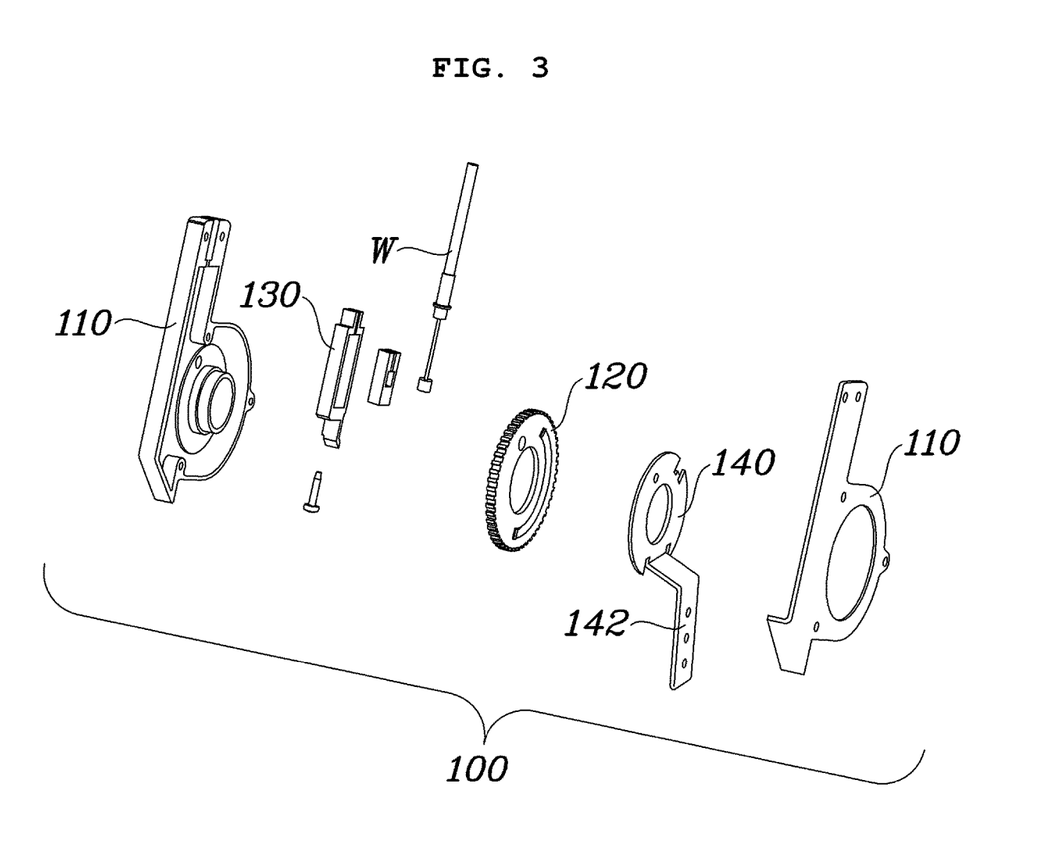
FIG. 3 is an exploded view showing an angle detection device according to the present disclosure.
Figure 4:
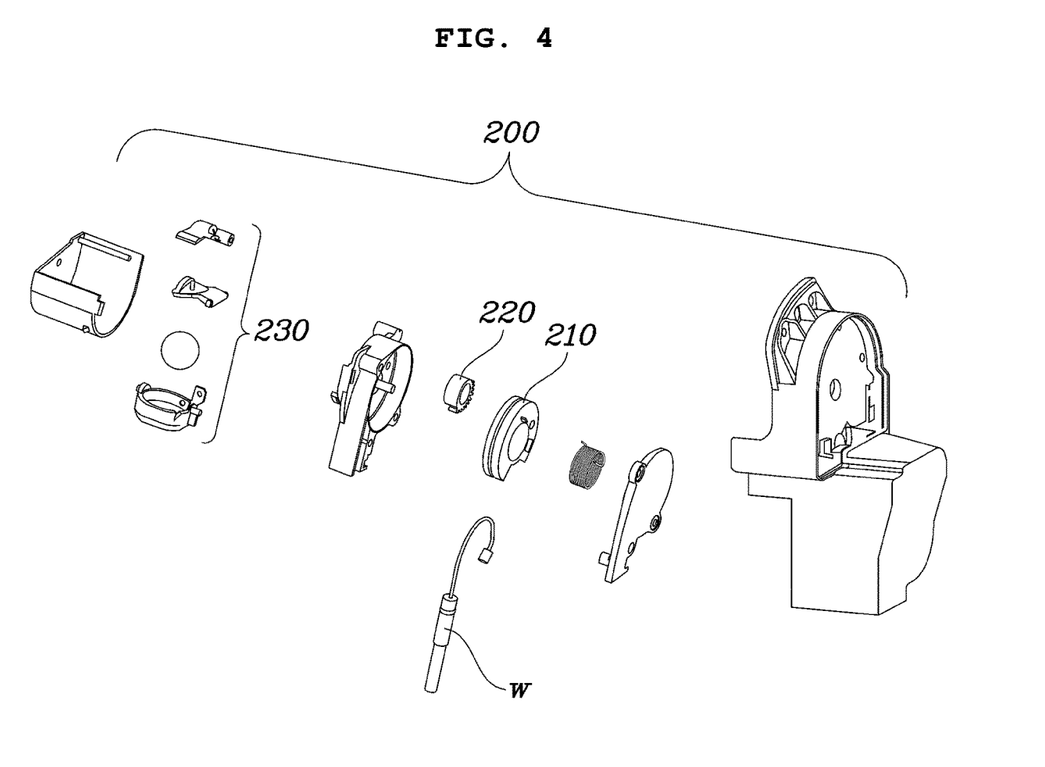
FIG. 4 is an exploded view showing a retractor device according to the present disclosure.
Figure 5:
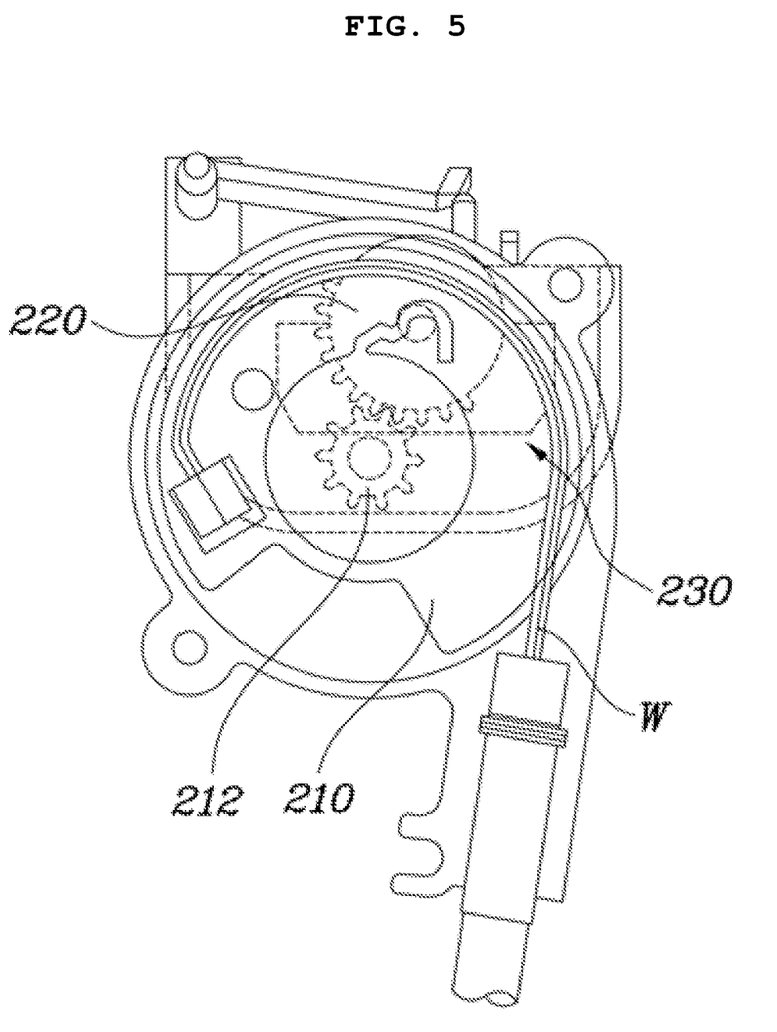
FIG. 5 is a view showing the retractor device according to the present disclosure.

FIG. 3 is an exploded view showing the angle detection device 100 of the present disclosure, FIG. 4 is an exploded view showing the retractor device 200 of the present disclosure, and FIG. 5 is a view showing the retractor device 200 of the present disclosure.

Referring to FIG. 3, the angle detection device 100 may have a case 110, which may be coupled to the lower portion of the seatback 10 and reclined together with the seatback 10 (as in FIGS. 6-9). A pinion 120 and a rack gear 130 may form a gear meshing in the case 110.

The pinion 120 is configured to be rotatable relative to the seatback 10 on a rotation shaft 12 configured to allow the seatback 10 to be reclined. The rack gear 130 is configured to be guided and moved along a movement space formed in the case 110 while rotating together with the case 110, and the lower end of the wire W is coupled to the rack gear 130.

The retractor device 200 may be installed in the seatback 10 (e.g., an upper portion of the seatback 10), and a pulley 210 with an external gear 212 and a sensor holder gear 220 is provided in the retractor device 200. Here, the external gear 212 of the pulley 210 and the sensor holder gear 220 are coupled to each other in a meshing structure.

Additionally, the upper end of the wire W is coupled to (e.g., wound around) the pulley 210. An acceleration sensor 230 (e.g., a ball sensor) configured to maintain its horizontality (e.g., by ball weight) is axially coupled to the sensor holder gear 220.

Accordingly, when the seatback 10 is reclined, the case 110 of the angle detection device 100 is rotated together with the seatback 10 around the rotation shaft 12 (e.g., see FIGS. 7-9), and the retractor device 200 reclines together with the seatback 10.

Then, the pinion 120 inside the case 110 moves within the movement space along the rack gear 130 with which the pinion is meshed. Accordingly, the lower end of the wire W fixed to the rack gear 130 is pulled.

When the lower end of the wire W is pulled, the wire W wound around the pulley 210 is drawn out by the angle at which the pulley 210 rotates. Here, when the wire W is drawn out, the pulley 210 rotates, and the acceleration sensor 230 rotates around the axis of the sensor holder gear 220, which is meshed with the external gear 212 of the pulley 210. Thus, the horizontality of the acceleration sensor 230 is maintained.

Figure 6:
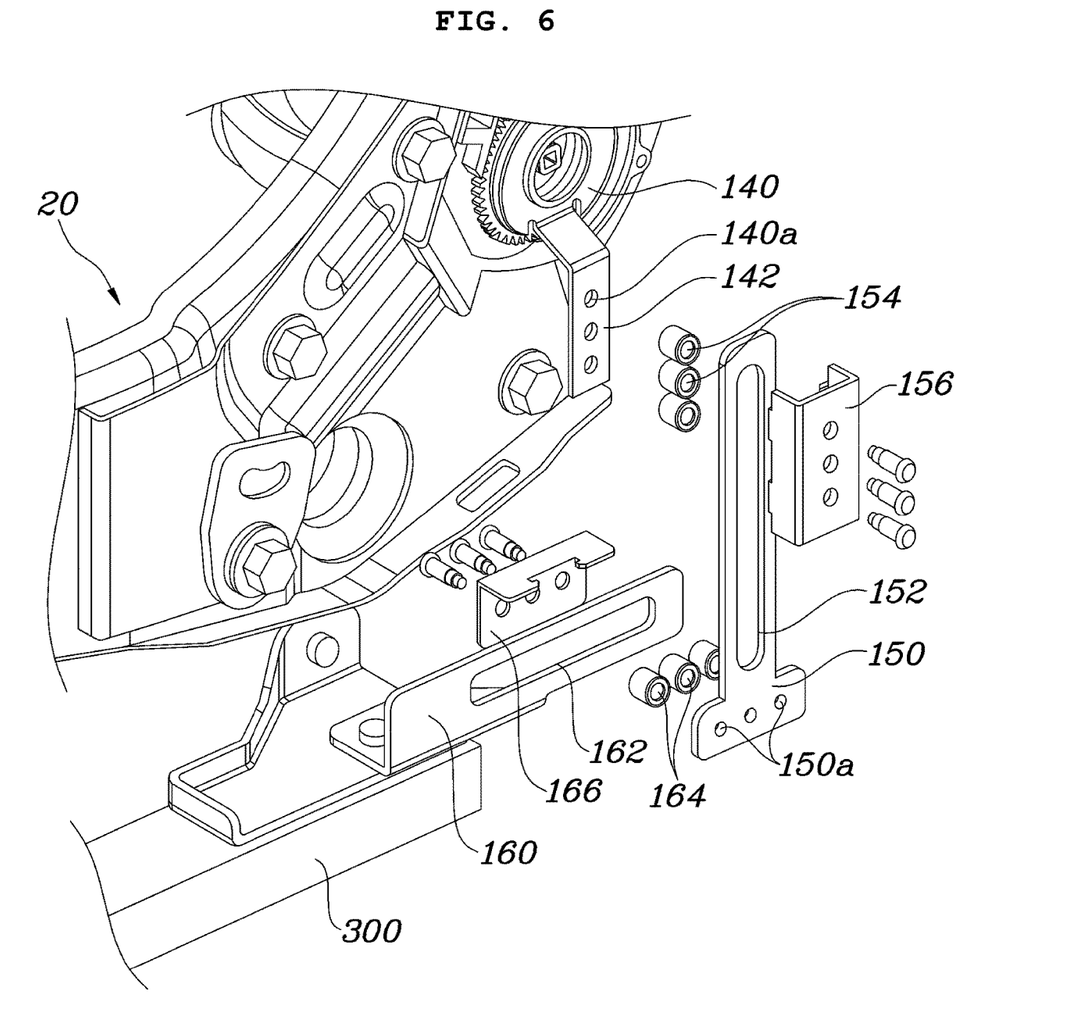
FIG. 6 is an exploded view showing components of a rotation limiting guide unit according to the present disclosure.

FIG. 6 is an exploded view showing components of a rotation limiting guide unit according to the present disclosure.

Referring to the FIG. 6, for example, a vehicle seat of the present disclosure includes the angle detection device 100 configured to detect a reclining angle of the seatback 10, an angle detection reference member 140 configured to serve as a reference for detecting an angle of the angle detection device 100, and a rotation limiting guide unit. The angle detection reference member 140 is rotatable relative to the rotation shaft 12, which is configured to allow the seatback 10 to be reclined. The rotation limiting guide unit may be configured to connect a seat fixing structure 300, on the floor of a vehicle passenger compartment, to the angle detection reference member 140. The rotation limiting guide unit is configured to limit rotation of the angle detection reference member 140 by guiding upward-and-downward movement and forward-and-rearward movement of the angle detection reference member 140 when the seat cushion 20 is tilted around a hinge structure (e.g., positioned to be aligned with the rotation shaft 12).

Specifically, the angle detection reference member 140 is coupled to the pinion 120 of the angle detection device 100, and is rotatable relative to the reclining rotation shaft 12 together with the pinion 120.

Particularly, since the angle detection reference member 140 is connected to the seat fixing structure 300 through the rotation limiting guide unit, the upward-and-downward movement and the forward-and-rearward movement of the angle detection reference member 140 may be guided by the rotation limiting guide unit during the tilting operation of the seat cushion 20 or the entire seat.

That is, during reclining of the seatback 10 and/or tilting operation of the seat cushion 20 and/or the entire seat, even if the rotation angle of the seat is changed, the angle detection reference member 140 only moves translationally in the upward-and-downward direction and/or the forward-and-rearward direction because of the rotation limiting guide unit, and does not rotate together with the seat.

Accordingly, since the orientation of the angle detection reference member 140 is maintained, regardless of the change in posture of the seat, the reference point of angle detection of the seatback 10 is always kept constant even when the seat is tilted, thereby making it possible to prevent an error in angle detection of the seatback 10.

The rotation limiting guide unit will be described in detail with reference to FIGS. 7 and 8. The rotation limiting guide unit includes a vertical guide 150 having a vertical guide hole 152 formed therein that is elongated in the upward-and-downward direction. The vertical guide 150 guides upward-and-downward movement of the angle detection reference member 140 along a path formed by the vertical guide hole 152. The rotation limiting guide unit also includes a horizontal guide 160 having a horizontal guide hole 162 formed therein that is elongated in the forward-and-rearward direction. The horizontal guide 160 guides the forward-and-rearward movement of the angle detection reference member 140 along a path of the horizontal guide hole 162.

The vertical guide 150 may comprise a plate shape elongated in the upward-and-downward direction, and the vertical guide hole 152 may be formed in a middle portion of the vertical guide 150 in the upward-and-downward direction.

The horizontal guide 160 may comprise a bracket shape having an L-shaped cross-section and elongated in the forward-and-rearward direction. The long horizontal guide hole 162 may be formed in an upper middle portion of the horizontal guide 160 in the forward-and-rearward direction.

Accordingly, when the seat cushion 20 is tilted, the angle detection reference member 140 may be guided to move in the vertical direction along the vertical guide hole 152 and/or to move in the horizontal direction along the horizontal guide hole 162.

As an example, the angle detection reference member 140 may be moved upwards and downwards in the vertical guide hole 152, the vertical guide 150 may be moved forwards and rearwards in the horizontal guide hole 162, and the horizontal guide 160 may be fixed to the seat fixing structure 300.

Specifically, a vertical guide roller 154 may be assembled to the angle detection reference member 140 so that the vertical guide roller 154 is moved upwards and downwards in the vertical guide hole 152, and a horizontal guide roller 164 may be assembled to the vertical guide 150 so that the horizontal guide roller 164 may be moved forwards and rearwards in the horizontal guide hole 162.

For example, a plate-shaped assembly part 142 may be formed at the lower end of the angle detection reference member 140. The assembly part 142 may be formed in a shape protruding downwards and bent toward the vertical guide 150, and a vertical guide roller assembly hole 140a may be formed in the assembly part 142.

Then, the vertical guide roller 154 may be configured to be inserted into the vertical guide hole 152, and the vertical guide roller 154 may be fastened and assembled to the vertical guide roller assembly hole 140a by a fixing element, such as a screw.

When the vertical guide roller 154 is fastened to the vertical guide 150, a roller cover 156 may be fastened to cover the vertical guide roller 154 on a side of the vertical guide 150 opposite to the assembly part 142.

In addition, a horizontal guide roller assembly hole 150a may be formed at the lower end of the vertical guide 150.

The horizontal guide roller 164 may be configured to be inserted into the horizontal guide hole 162. The horizontal guide roller 164 may be fastened and/or assembled to the horizontal guide roller assembly hole 150a by a fixing element, such as a screw.

When the horizontal guide roller 164 is fastened to the horizontal guide 160, a roller cover 166 may be fastened to cover the horizontal guide roller 164 on a side of the lower end of the vertical guide 150 opposite to the horizontal guide 160.

The vertical guide roller 154 assembled to the assembly part 142 is able to move upwards or downwards along the vertical guide hole 152, thereby guiding the upward-and-downward movement of the angle detection reference member 140. The horizontal guide roller 164 assembled to the vertical guide 150 is able to move forwards or rearwards along the horizontal guide hole 162, thereby guiding the forward-and-rearward movement of the angle detection reference member 140.

A plurality of the vertical guide rollers 154 may be provided at the lower portion of the angle detection reference member 140 in the upward-and-downward direction, and a plurality of horizontal guide rollers 164 may be provided at the lower portion of the vertical guide 150 in the forward-and-rearward direction.

For example, at least two vertical guide rollers 154 may be provided and arranged in an upwards and downwards direction in order to enable the angle detection reference member 140 to stably move in the upward-and-downward direction along the vertical guide hole 152, and at least two horizontal guide rollers 164 may be provided and arranged in a forwards and rearwards direction in order to enable the vertical guide 150 to stably move in the forward-and-rearward direction along the horizontal guide hole 162.

The seat fixing structure 300 may be, for example, a seat rail coupled to the floor of the vehicle compartment.

For example, a fixed rail of a seat rail may be fixed forwards and rearwards on the floor of the vehicle passenger compartment, and a moving rail configured to move forwards and rearwards along the fixed rail may be assembled onto the fixed rail.

Accordingly, the lower end of the horizontal guide 160 may be bolted and assembled to the moving rail. In this manner, when the seat is moved forwards and rearwards, the angle detection reference member 140 is also moved forwards and rearwards together with the seat.

Opposite ends of a tilting link 310 may be respectively connected to the seat fixing structure 300 and the seat cushion 20 in a hinge structure so that the seat cushion 20 may be tilted. The tilting link 310 may be coupled to the front of the angle detection reference member 140.

Specifically, the upper end of the tilting link 310 may be coupled to the front of the rotating shaft 12 on which the seatback 10 is reclined by a first hinge structure 312, and the lower end of the tilting link 310 may be connected to the moving rail by a second hinge structure 314.

When the front end of the seat cushion 20 is lifted upwards by tilting operation, the upper end of the tilting link 310 is rotated forwards around the second hinge structure 314. Accordingly, the rear end position of the seat cushion 20 is moved forwards and downwards.

Accordingly, when the seat cushion 20 is tilted, the angle detection reference member 140 is translated downwards along the vertical guide hole 152, and the vertical guide 150 is translated forwards along the horizontal guide hole 162, all while a rotation posture of the angle detection reference member 140 is maintained.

Hereinafter, a description will be given as to operation of maintaining the posture of the angle detection reference member 140 when the seat is tilted.

Figure 7:
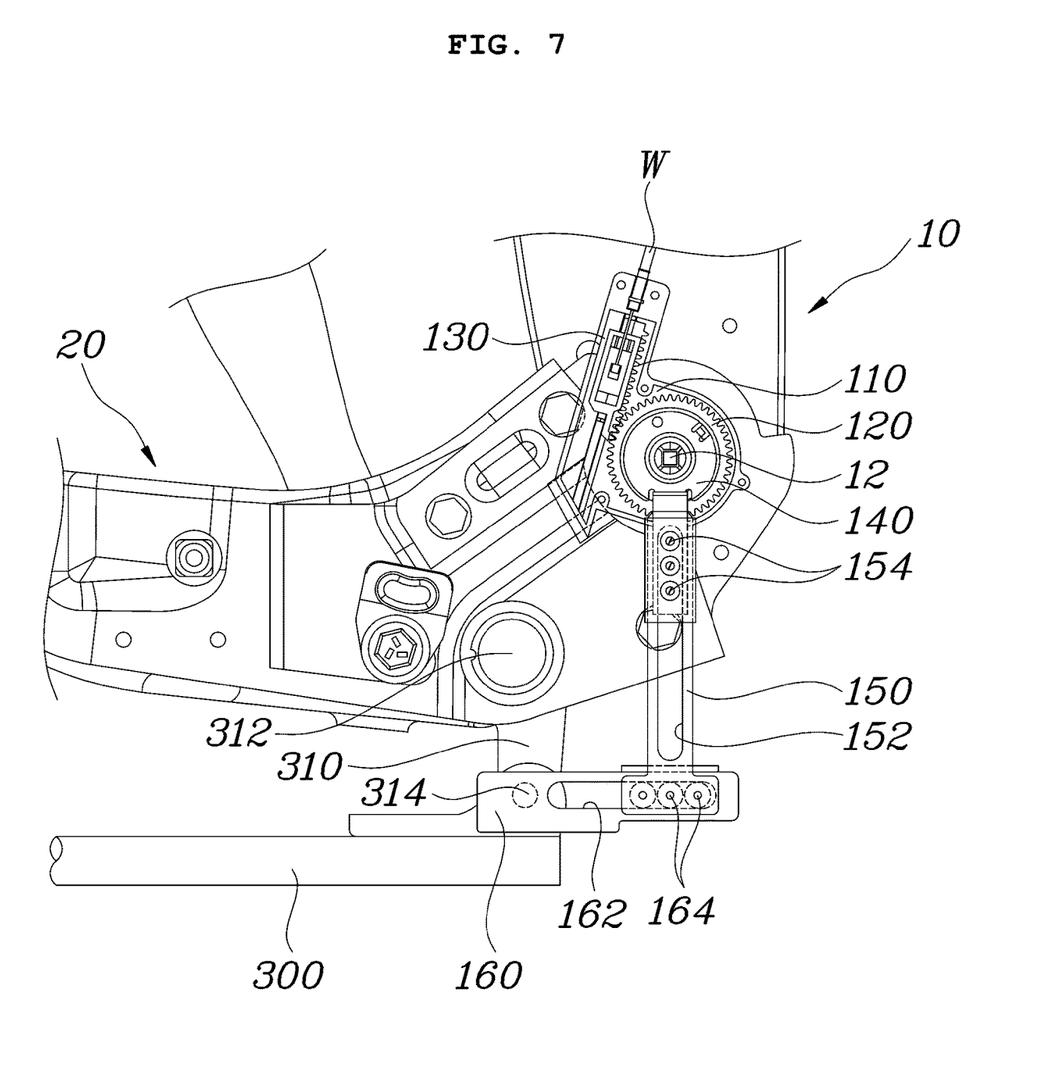
FIG. 7, FIG. 8, and FIG. 9 are views showing the retractor device maintaining a posture of an angle detection reference member through the rotation limiting guide unit when a seat cushion is tilted.
Figure 8:
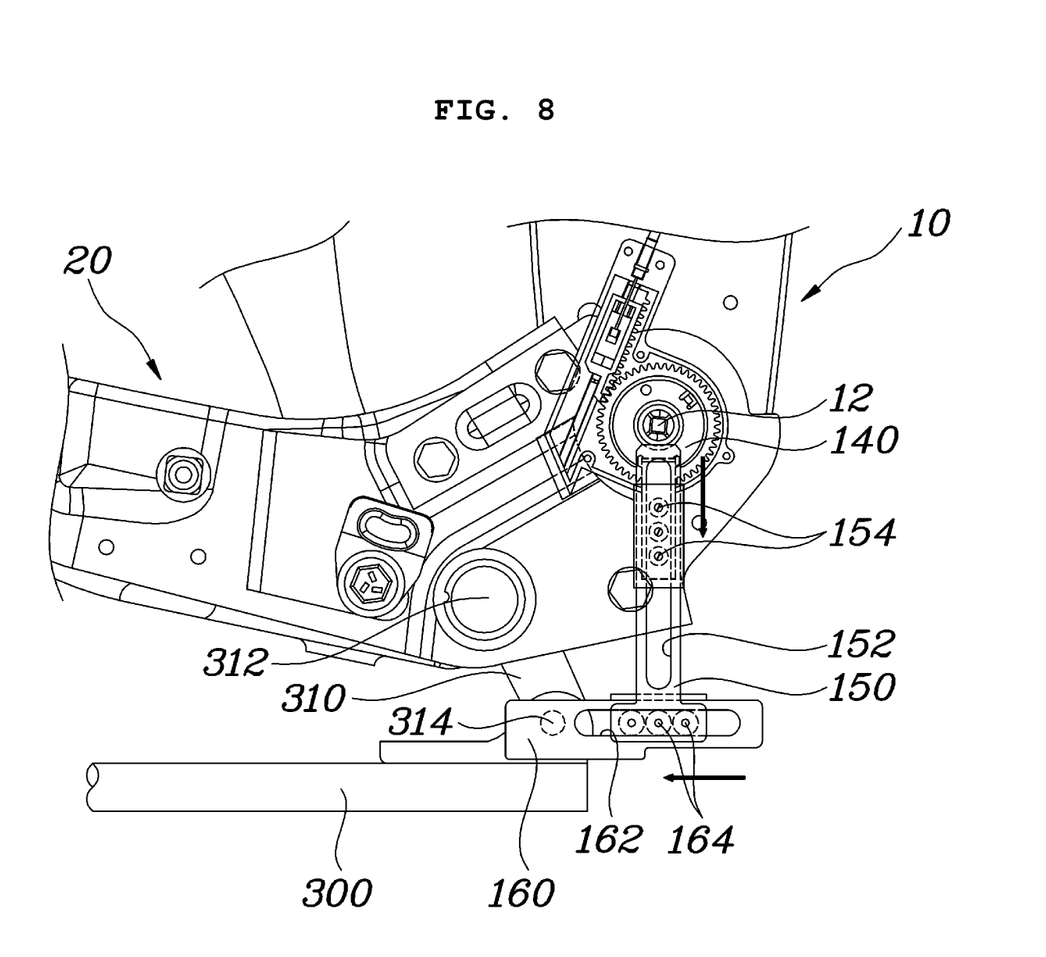

In the state of FIG. 7, when the seat is tilted by about 5°, the vertical guide roller 154 assembled to the angle detection reference member 140 begins to move downwards along the vertical guide hole 152 formed in the vertical guide 150, and simultaneously, the horizontal guide roller 164 assembled to the vertical guide 150 begins to move forwards along the horizontal guide hole 162 formed in the horizontal guide 160, as shown in FIG. 8.

Figure 9:
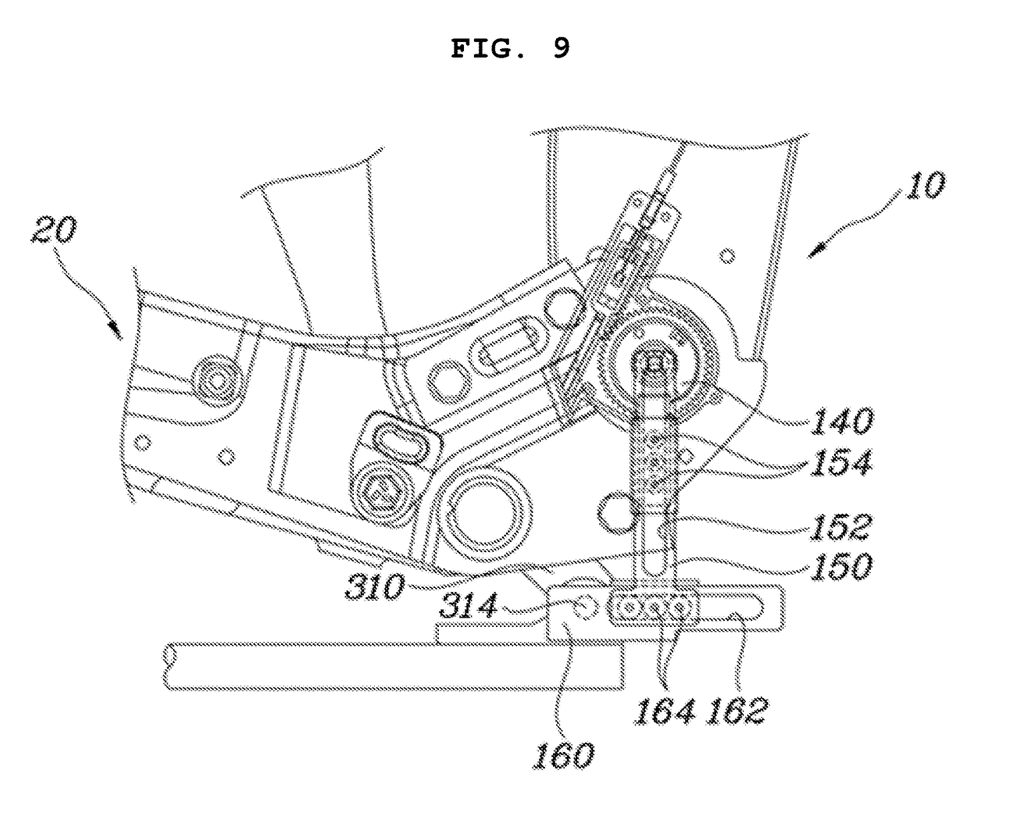

Subsequently, when the seat is further tilted by about 5° in the state of FIG. 8, the vertical guide 150 is further moved downwards along the vertical guide hole 152, and the vertical guide 150 is moved toward the frontmost portion of the horizontal guide hole 162.

Therefore, when the seat cushion 20 is tilted, the angle detection reference member 140 is translated without rotation along the vertical guide hole 152 upwards and downwards and along the horizontal guide hole 162 forwards and rearwards, thereby making it possible to maintain a rotation posture of the angle detection reference member 140.

For reference, when the seat is tilted, the seatback 10 is also tilted rearwards. Accordingly, the lower end of the wire W coupled to the angle detection device 100 is pulled. Accordingly, the pulley 210 rotates in one direction while the upper end of the wire W coupled to the retractor device 200 is drawn out toward the angle detection device 100, and the sensor holder gear 220 meshed with the external gear 212 of the pulley 210 rotates in the other direction, thereby maintaining horizontality of the acceleration sensor 230 axially coupled to the sensor holder gear 220.

As described above, even if the rotation angle of the seat is changed during the tilting operation of the seat, the angle detection reference member 140 is moved only in the upward-and-downward direction and the forward-and-rearward direction, and is not rotated (e.g., its rotation posture is not changed).

Therefore, since the angle detection reference member 140 is always maintained in a constant rotation posture, regardless of a change in posture of the seat, and because the angle detection reference member 140 may serve as a reference for detection of an angle of the seatback 10, the reference is kept constant when the seat is tilted, thereby preventing an error in angle detection of the seatback 10.

As is apparent from the above description, during tilting operation of a seat, even if a rotation angle of the seat is changed, an angle detection reference member is moved only in the upward-and-downward direction and the forward-and-rearward direction, and is not rotated, allowing it to serve as a reference for detecting an angle of a seatback, even when the seat is tilted, thereby preventing an error in angle detection of the seatback.

The present subject matter provides a vehicle seat configured to prevent an error in angle detection by constantly maintaining a reference point of seatback angle detection regardless of a change in posture of a seat cushion or an entire seat in a reclining seat.

In accordance with the present disclosure, the above and other objects can be accomplished by the provision of a vehicle seat including an angle detection device configured to detect a reclining angle of a seatback, an angle detection reference member serving as a reference of detecting an angle of the angle detection device, wherein the angle detection reference member is installed to be rotatable relative to a rotation shaft configured to allow the seatback to be reclined, and a rotation limiting guide unit configured to connect a seat fixing structure on a floor of a vehicle passenger compartment to the angle detection reference member, wherein the rotation limiting guide unit limits rotation of the angle detection reference member by guiding upward-and-downward movement and forward-and-rearward movement of the angle detection reference member when a seat cushion is tilted based on a hinge structure positioned to be aligned with the rotation shaft.

The rotation limiting guide unit may include a vertical guide having a long vertical guide hole formed therein in an upward-and-downward direction, wherein the vertical guide may guide the upward-and-downward movement of the angle detection reference member along a path of the vertical guide hole, and a horizontal guide having a long horizontal guide hole formed therein in a forward-and-rearward direction thereof, wherein the horizontal guide may guide the forward-and-rearward movement of the angle detection reference member along a path of the horizontal guide hole.

The angle detection reference member may be moved upwards and downwards in the vertical guide hole, the vertical guide may be moved forwards and rearwards in the horizontal guide hole, and the horizontal guide may be fixed to the seat fixing structure.

The angle detection reference member may have a vertical guide roller assembled thereto, wherein the vertical guide roller may be moved upwards and downwards in the vertical guide hole, and the vertical guide may have a horizontal guide roller assembled thereto, wherein the horizontal guide roller may be moved forwards and rearwards in the horizontal guide hole.

A plurality of the vertical guide rollers may be provided in the upward-and-downward direction at a lower portion of the angle detection reference member, and a plurality of the horizontal guide rollers may be provided in the forward-and-rearward direction at a lower portion of the vertical guide.

The seat fixing structure may be a seat rail coupled to the floor of the vehicle passenger compartment.

Opposite ends of a tilting link may be respectively connected to the seat fixing structure and the seat cushion in the hinge structure so that the seat cushion is tilted.

The tilting link may be coupled to a front of the angle detection reference member.

During tilting operation of the seat cushion, the angle detection reference member may be linearly moved in the upward-and-downward direction along the vertical guide and may be linearly moved in the forward-and-rearward direction along the horizontal guide, thereby constantly maintaining a rotation posture of the angle detection reference member without a change in the rotation posture.

Although the above examples of the present disclosure have been disclosed for illustrative purposes, those skilled in the art will appreciate that various modifications, additions, and substitutions are possible, without departing from the scope and spirit of the disclosure and the accompanying claims.

What is claimed is:

1. A vehicle seat comprising:
a seat cushion;
a seatback connected to the seat cushion;
an angle detection device configured to detect a reclining angle of the seatback;
an angle detection reference member that is rotatable relative to a rotation shaft configured to allow the seatback to be reclined; and
a rotation limiting guide unit configured to connect a seat fixing structure to the angle detection reference member and configured to limit rotation of the angle detection reference member by guiding upward-and-downward movement or forward-and-rearward movement of the angle detection reference member when the seat cushion is tilted around a hinge structure,
wherein the rotation limiting guide unit comprises a vertical guide that forms a vertical guide hole elongated in an upward-and-downward direction, wherein the vertical guide is configured to guide the upward-and-downward movement of the angle detection reference member along the vertical guide hole,
wherein the angle detection reference member comprises a vertical guide roller assembled thereto, wherein the vertical guide roller is configured to move upwards and downwards in the vertical guide hole, and
wherein a plurality of vertical guide rollers, comprising the vertical guide roller, are provided in an upward-and-downward direction at a lower portion of the angle detection reference member.

2. The vehicle seat according to claim 1, wherein the rotation limiting guide unit further comprises:
a horizontal guide that forms a horizontal guide hole formed elongated in a forward-and-rearward direction, wherein the horizontal guide is configured to guide the forward-and-rearward movement of the angle detection reference member along the horizontal guide hole.

3. The vehicle seat according to claim 2, wherein:
the angle detection reference member is configured to move upwards and downwards in the vertical guide hole;
the vertical guide is configured to move forwards and rearwards in the horizontal guide hole; and
the horizontal guide is fixed to the seat fixing structure.

4. The vehicle seat according to claim 3, wherein:
the vertical guide comprises a horizontal guide roller assembled thereto, wherein the horizontal guide roller is configured to move forwards and rearwards in the horizontal guide hole.

5. The vehicle seat according to claim 4, wherein:
a plurality of horizontal guide rollers, comprising the horizontal guide roller, are provided in the forward-and-rearward direction at a lower portion of the vertical guide.

6. The vehicle seat according to claim 2, wherein, during tilting operation of the seat cushion, the angle detection reference member is translated, without a rotation of the angle detection reference member by the seat cushion, in the upward-and-downward direction along the vertical guide or in the forward-and-rearward direction along the horizontal guide.

7. The vehicle seat according to claim 1, wherein the seat fixing structure is coupled to a floor of a vehicle passenger compartment.

8. The vehicle seat according to claim 1, wherein opposite ends of a tilting link are respectively connected to the seat fixing structure and the seat cushion via the hinge structure.

9. The vehicle seat according to claim 8, wherein the tilting link is coupled to the seat fixing structure in front of the angle detection reference member.

10. A vehicle seat comprising:
a seat cushion;
a seatback connected to the seat cushion;
a case comprising a member that is rotatable relative to a rotation shaft configured to allow the seatback to be reclined; and
a fixture comprising a vertical guide configured to connect a seat fixing structure to the member and configured to limit rotation of the member by guiding upward-and-downward movement or forward-and-rearward movement of the member when the seat cushion is tilted around a hinge structure,
wherein the vertical guide forms a vertical guide hole elongated in an upward-and-downward direction, wherein the vertical guide is configured to guide the upward-and-downward movement of the member along the vertical guide hole,
wherein the member is configured to be coupled to a vertical guide roller, wherein the vertical guide roller is configured to move upwards and downwards in the vertical guide hole, and
wherein a plurality of vertical guide rollers, comprising the vertical guide roller, are provided in an upward-and-downward direction at a portion of the member.

11. The vehicle seat according to claim 10, wherein the vertical guide is coupled to:
a horizontal guide that forms a horizontal guide hole formed elongated in a forward-and-rearward direction, wherein the horizontal guide is configured to guide the forward-and-rearward movement of the member along the horizontal guide hole.

12. The vehicle seat according to claim 11, wherein the vertical guide is coupled to the horizontal guide via a plurality of horizontal guide rollers.

13. The vehicle seat according to claim 10, wherein the plurality of vertical guide rollers are configured to move along a vertical path of the vertical guide hole.

14. The vehicle seat according to claim 10, wherein the member comprises an angle detection reference member, and
wherein the angle detection reference member comprises:
an upper part coupled to a pinion; and
a lower part comprising a plurality of holes configured to couple the plurality of vertical guide rollers.

15. The vehicle seat according to claim 10, wherein the fixture comprises a rotation limiting guide, and wherein the rotation limiting guide comprises the vertical guide and a horizontal guide.

16. A vehicle seat comprising:
a seat cushion;
a seatback connected to the seat cushion;
a case comprising a member that is rotatable relative to a rotation shaft configured to allow the seatback to be reclined; and
a fixture comprising a vertical guide configured to connect a seat fixing structure to the member and configured to limit rotation of the member by guiding upward-and-downward movement or forward-and-rearward movement of the member when the seat cushion is tilted around a hinge structure,
wherein the vertical guide forms a vertical guide hole elongated in an upward-and-downward direction, wherein the vertical guide is configured to guide the upward-and-downward movement of the member along the vertical guide hole,
wherein the member is configured to be coupled to a vertical guide roller, wherein the vertical guide roller is configured to move vertically in the vertical guide hole,
wherein the vertical guide roller is provided in an upward-and-downward direction at a portion of the member, and
wherein the vertical guide is coupled to a horizontal guide via a horizontal guide hole of the horizontal guide, wherein at least one horizontal guide roller is configured to move horizontally in the horizontal guide hole.

17. The vehicle seat according to claim 16, wherein a plurality of vertical guide rollers, comprising the vertical guide roller, are configured to move along a vertical path of the vertical guide hole.

18. The vehicle seat according to claim 16, wherein the member comprises an angle detection reference member, and
wherein the angle detection reference member comprises:
an upper part coupled to a pinion; and
a lower part comprising a plurality of holes configured to couple a plurality of vertical guide rollers comprising the vertical guide roller.

19. The vehicle seat according to claim 16, wherein the fixture comprises a rotation limiting guide, and wherein the rotation limiting guide comprises the vertical guide and the horizontal guide.

* * * * *